Feb. 27, 1951 J. A. HAGAN 2,543,017
QUICK RELEASE CLAMP
Filed June 23, 1945

INVENTOR
JOHN A. HAGAN

BY Ralph L Chappell
ATTORNEY

Patented Feb. 27, 1951

2,543,017

UNITED STATES PATENT OFFICE 2,543,017

QUICK RELEASE CLAMP

John A. Hagan, United States Navy, Quincy, Mass.

Application June 23, 1945, Serial No. 601,280

6 Claims. (Cl. 294—106)

(Granted under the act of March 3, 1883, as amended April 30, 1928; 370 O. G. 757)

This invention relates to clamps for handling heavy plates and is illustrated herein as embodied in a clamp which can be attached to a plate firmly and quickly and which can be released quickly.

Heavy plates of metal are difficult to handle because of their unwieldly size and great weight. A common type of clamp used for handling metal plates is one which is constructed with a pair of jaws which are forced together by a linkage within the clamp to tighten on a plate when a pull is exerted on the clamp. The plate is gripped by the clamp only when there is a pull exerted on the linkage and away from the plate to be gripped. This type of clamp can be fixed to a plate or removed therefrom quickly, but it is unsatisfactory for several reasons. Firstly, the clamp releases suddenly when the plate carried by it is lowered to the ground or to the deck of a ship, and the clamp may be released by mistake. Moreover, this type of clamp is easily loosened once the pull thereon is relieved. Expert care by the operator is required to prevent accidents caused by unexpectedly falling plates which may injure personnel and damage nearby material. In addition, it is not possible to attach a clamp of this type in a satisfactory manner to a plate which is flat on the ground or on a deck because, when a plate is so disposed, it is difficult to attach a clamp thereto in such a manner that there is an initial pull on the clamp in a proper direction to cause it to grip the plate.

In view of the foregoing, it is a principal object of this invention to provide a clamp for handling heavy metal plates which can quickly, yet firmly, be attached to a plate.

It is a further object of this invention to provide for the speedy removal of such a clamp.

It is a further object of this invention to prevent the accidental release of such a clamp.

A further object of this invention is to provide a clamp which can be attached to a plate securely without applying a hoisting force to the clamp.

Accordingly, this invention provides, in a clamp having a pair of jaws one of which is movable to grip or hold an object therebetween in response to a pull exerted on a bolt associated with the jaws, a means for locking the bolt against reverse movement. In the illustrated clamp, the pull is produced independently of any hoisting force by means of a nut threaded to the shank of the bolt and adapted to bear upon a casing of the clamp.

The jaws of a clamp provided in accordance with this invention are positively closed and locked in place upon an object held by them. Moreover, the clamp not only can be attached to or released from a heavy plate quickly, but also is firmly fixed to the plate once it is attached thereto.

With the above and other features and objects in view, the invention will now be described with reference to the accompanying drawings which illustrate a preferred embodiment of the invention and will be pointed out in the claims.

Figure 1:
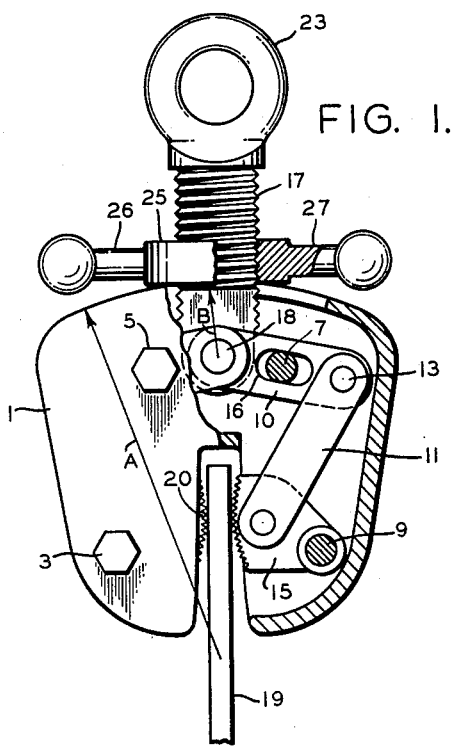
Fig. 1 is a front elevational view of a clamp constructed in accordance with this invention, the clamp being shown in position to grip a metal plate, part of the casing of the clamp being broken away to show the internal linkage.
Figure 2:
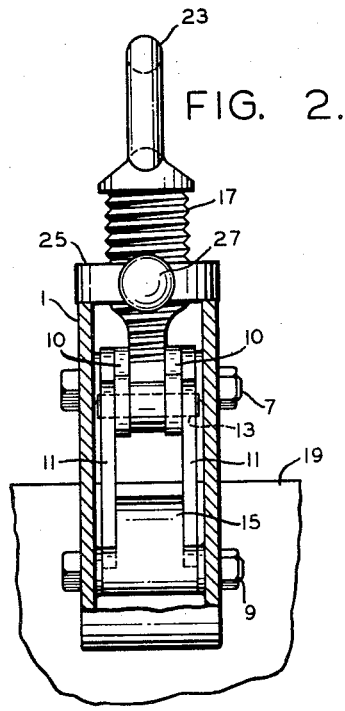
Fig. 2 is a side elevational view of the clamp shown in Fig. 1, the casing being cut away to show the internal linkage.

As illustrated in Figs. 1 and 2, the clamp includes a casing 1 which is hollow and through which four openings are drilled to take four bolts 3, 5, 7, and 9, which support a linkage inside the casing and form pivots around which the moving parts of the linkage swing.

In Fig. 1 the right hand half of the casing is broken away to show the linkage within. Inside the left hand side of the casing there is a linkage similar to that in the right hand side, and, therefore, only the right hand linkage will be described in detail.

The right hand linkage includes a pair of arms 10 and 11. One end of each arm is connected to the other arm by a pin 13. Pivoted to the other end of the arm 11 is a jaw 15 which swings around the bolt 9. The arm 10 pivots around the bolt 7 which fits through a slot 16 in the arm 10 to form a fulcrum about which the arm 10 swings, as clearly shown in Fig. 1. The left hand end of the arm 10 is pivotally attached to a bolt 17 by a pin 18 at the bottom of the bolt. The bolt acts through the arms 10 and 11 to open or close the jaw 15. When the bolt 17 is pulled outwardly of the casing, the linkage drives the jaw 15 to the left into position to grip a plate 19, of which only a portion is shown. Conversely, when the bolt descends, the jaw moves to the right into released position.

A similar linkage in the left hand side of the clamp closes and opens a second jaw 20 through the action of the bolt 17. When the bolt 17 is pulled away from the clamp, the jaws 15 and 20 are forced together to grip the plate 19. On the other hand, when the pull on the bolt 17 is released, the grip of the jaws on the plate also is released.

An annular ring 23 forms the upper part of bolt 17. A crane hook or other lifting device is attached to the ring to lift the clamp together with the plate.

The shank of the bolt 17 is threaded as shown in Figs. 1 and 2 to carry a nut 25. The lower surface of the nut 25 bears upon the upper surface of the casing 1 to exert a pull on the bolt 17 and lock the bolt in position to prevent release of the jaws. A pair of arms 26 and 27, attached to the nut 25, facilitates the turning of the nut.

The upper surface of the casing is constructed with a radius A which is relatively longer than the radius B through which the lower surface of the nut 25 swings about the linkage, as shown in Fig. 1. The upper surface of the casing 1 forms an abutment against which the nut 25 is frictionally locked when it is set up to exert a pull on the bolt 17. Moreover, when the nut is in locking position, a pull on the ring 23 in any direction which causes the bolt 17 to swing about the pin 18 creates an additional tightening of the jaws on the plate 19 owing to the wedging action between the nut 25 and the upper surface of the casing 1.

The clamp described can quickly and easily be attached to a plate. The clamp is placed upon the plate with the jaws engaging the opposite sides of the plate as shown in Fig. 1. Then, the nut 25 is rotated with the aid of the arms 26 and 27 until it bears on the upper surface of the casing. The nut can normally be turned by hand without the aid of special tools. However, it may be necessary to give the nut a blow with a hammer to lock it firmly in place. The clamp can be attached as described in a few seconds. The nut 25 exerts a continuous pull on the bolt 17, and, as already pointed out, the lifting pull serves to tighten the grip of the jaws and hold the clamp in place on the plate regardless of the direction of the initial lifting pull. Thus, the clamp can be attached satisfactorily to a sheet which is flat on the ground. Moreover, the clamp does not release automatically as soon as the plate carried by it touches the ground or the deck of a ship, and the clamp cannot be knocked loose accidentally by anything less than a blow on one of the arms 26 and 27 which causes the nut 25 to turn to release the locking effect combined with a violent contact of the bottom of the plate 19 with the ground or a deck. This possibility is very remote because of the protection afforded the arms 26 and 27 by the wide front of the casing 1 (Fig. 1) and by the plate 19, carried by the clamp, which extends perpendicular to the narrow side of the clamp (Fig. 2). On the other hand, when it is desired to release a plate carried by the clamp, the clamp can be removed quickly at any time when the lower portion of the plate rests on a solid surface. The nut 25 is rotated to move up the bolt 17 outwardly of the clamp either by turning by hand or by a blow of a hammer to release the pressure between the jaws 15 and 20, thus releasing the grip of the clamp on the plate and permitting it to be removed therefrom.

Figure 3:
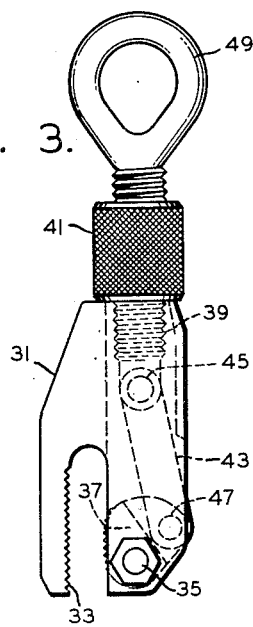
Fig. 3 is a front elevational view of another clamp constructed in accordance with this invention, the internal linkage being shown by dotted lines.

Fig. 3 illustrates a clamp of the same general type as that already described but of somewhat simpler construction. The clamp shown in Fig. 3 is suitable for carrying relatively lighter loads than the one illustrated in Figs. 1 and 2. This second clamp comprises a casing 31 having a stationary jaw 33, and carrying a bolt 35 on which a jaw 37 is pivoted. The casing is bored slidably to receive a bolt 39 on which is threaded a knurled nut 41, the latter being adapted to bear against the top of the casing 31. A link 43 is pivotally connected to the bolt 39 and the jaw 37 at 45 and 47 respectively. The nut 41 can be turned with the fingers to force it to exert a pull on the bolt 39. An annular ring 49 which forms the upper portion of the bolt 39 provides means for connecting the clamp to a crane hook to left the clamp together with a metal plate gripped by the jaws.

A clamp constructed as shown in Fig. 3 has been found suitable for carrying loads of a ton or more. On the other hand, clamps of the type illustrated in Figs. 1 and 2 are satisfactory for handling much greater loads.

The invention described herein may be manufactured and used by or for the Government of the United States of America for government purposes without the payment of any royalty thereon or therefor.

Having thus described my invention what I claim as novel and desire to protect by Letters Patent of the United States is:

1. A clamp comprising a casing, a pair of jaws, said jaws being movable to form a bite with each other, a bolt, means comprising links to which said bolt is pivoted connecting one end of said bolt and said jaws for forcing said jaws toward each other when a pull is exerted on said bolt, and a nut for exerting a pull on said bolt, said nut being threaded to the shank of said bolt and adapted to bear on said casing, the radius of curvature of the portion of said casing upon which said nut bears being greater than the radius through which said nut swings with respect to said link.

2. A clamp comprising a casing, a pair of jaws operatively positioned within said casing, said jaws being relatively movable to form a bite with each other, a bolt, means comprising links to which said bolt is pivotally secured and connecting said bolt and said jaws for forcing said jaws toward each other when a pull is exerted on said bolt, a nut, said nut being threaded to the shank of said bolt and adapted to bear on said casing, said casing having an external curvature which precludes relative rotation between said bolt and said casing in the plane of said links about the point of connection of said bolt to said links when said nut bears on said casing and which permits said relative rotation when said nut is free of said casing.

3. A clamp comprising a substantially flat casing, a pair of jaws pivotally supported within said casing, said jaws being relatively movable to form a bite with each other, a bolt, means comprising a pair of first links pivotally connected to said bolt and a pair of second links pivotally connected between said first links and said pair of jaws for interconnecting said bolt and said jaws, said links being arranged whereby said jaws are urged toward each other when a pull is exerted on said bolt, a nut threaded to the shank of said bolt and adapted to bear on said casing thereby exerting a pull on said bolt, the radius of curvature of the portion of said casing upon which nut bears being greater than the radius through which said nut swings with respect to said first links.

4. Apparatus as in claim 3 wherein said nut includes a plurality of integral arms extending therefrom, the diameter of the circle described by the ends of said arms when rotated about said bolt being less than the width of said casing across the flat surface thereof.

5. A clamp comprising, a casing, said casing including an integral extension thereof arranged to provide a rigid clamping jaw, a movable jaw pivotally secured within said casing and disposed adjacent said fixed jaw, said fixed and movable jaws forming a bite with each other, a bolt extending into said casing, said bolt having at the outer end thereof means for lifting said clamp, a link extending from the inner end of said bolt to said movable jaw, said link being arranged whereby said movable jaw is urged toward said fixed jaw when a pull is exerted on said bolt, and a nut threaded to the shank of said bolt and adapted to bear on said casing said casing having a bearing surface for said nut so shaped and spaced from the point of connection of said bolt to said link to preclude relative rotation between said bolt and said casing in the plane of said link about said point of connection when said nut engages said bearing surface and said jaws have a bite on an object to be lifted, and to permit relative rotation when said nut is free of said bearing surface.

6. A clamp comprising a casing, a pair of jaws associated with said casing, said jaws being relatively movable with respect to each other to form a bite with each other, a bolt, linkage to which said bolt is pivotally secured connecting said bolt to one of said jaws for reducing the spacing of said jaws when a pull is exerted on said bolt, a nut, said nut being threaded to the shank of said bolt and adapted to bear on an upper portion of said casing, said upper portion of said casing being so shaped and spaced from the point of connection of said bolt to said linkage to preclude relative rotation between said bolt and said casing in the plane of said linkage about the point of connection of said bolt to said linkage, when said nut bears on said upper portion of said casing and said jaws have a bite on an object to be lifted, and to permit said relative rotation when said nut is free of said upper portion of said casing.

JOHN A. HAGAN.

REFERENCES CITED

The following references are of record in the file of this patent:

UNITED STATES PATENTS

| Number | Name | Date |
| --- | --- | --- |
| 576,179 | Wood | Feb. 2, 1897 |
| 1,011,660 | Strathern | Dec. 12, 1911 |
| 1,514,983 | Monnich | Nov. 11, 1924 |
| 2,310,869 | Racz | Feb. 9, 1943 |
| 2,348,741 | Jessen | May 16, 1944 |
| 2,360,601 | Waldrup | Oct. 17, 1944 |
| 2,386,034 | Church | Oct. 2, 1945 |